2 Sheets--Sheet 1.
A. BROADNAX.
Rendering and Refining Animal Matter, &c.
No. 5,195. Reissued Dec. 24, 1872.
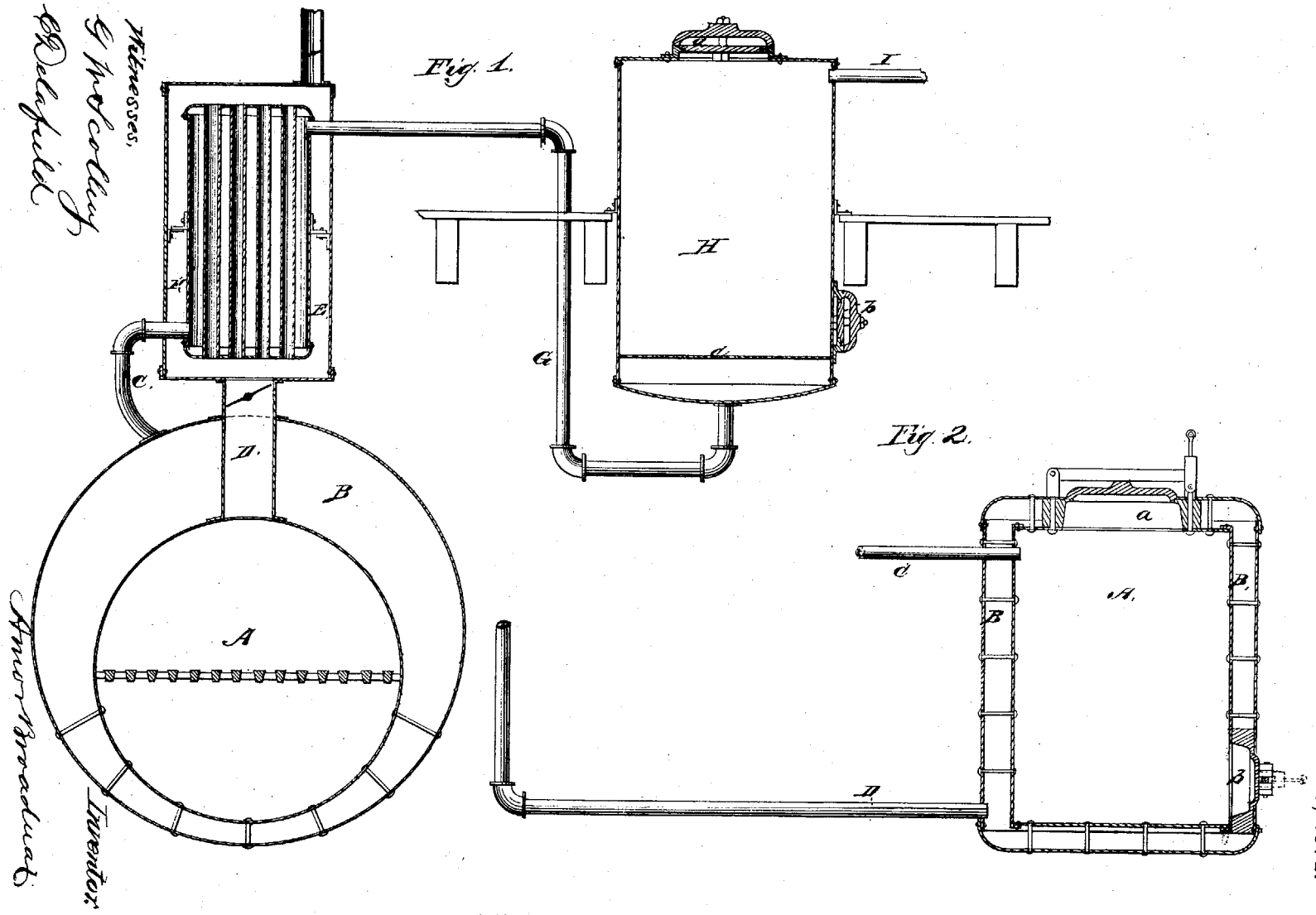

2 Sheets--Sheet 2.
A. BROADNAX.
Rendering and Refining Animal Matter, &c.
No. 5,195. Reissued Dec. 24, 1872.
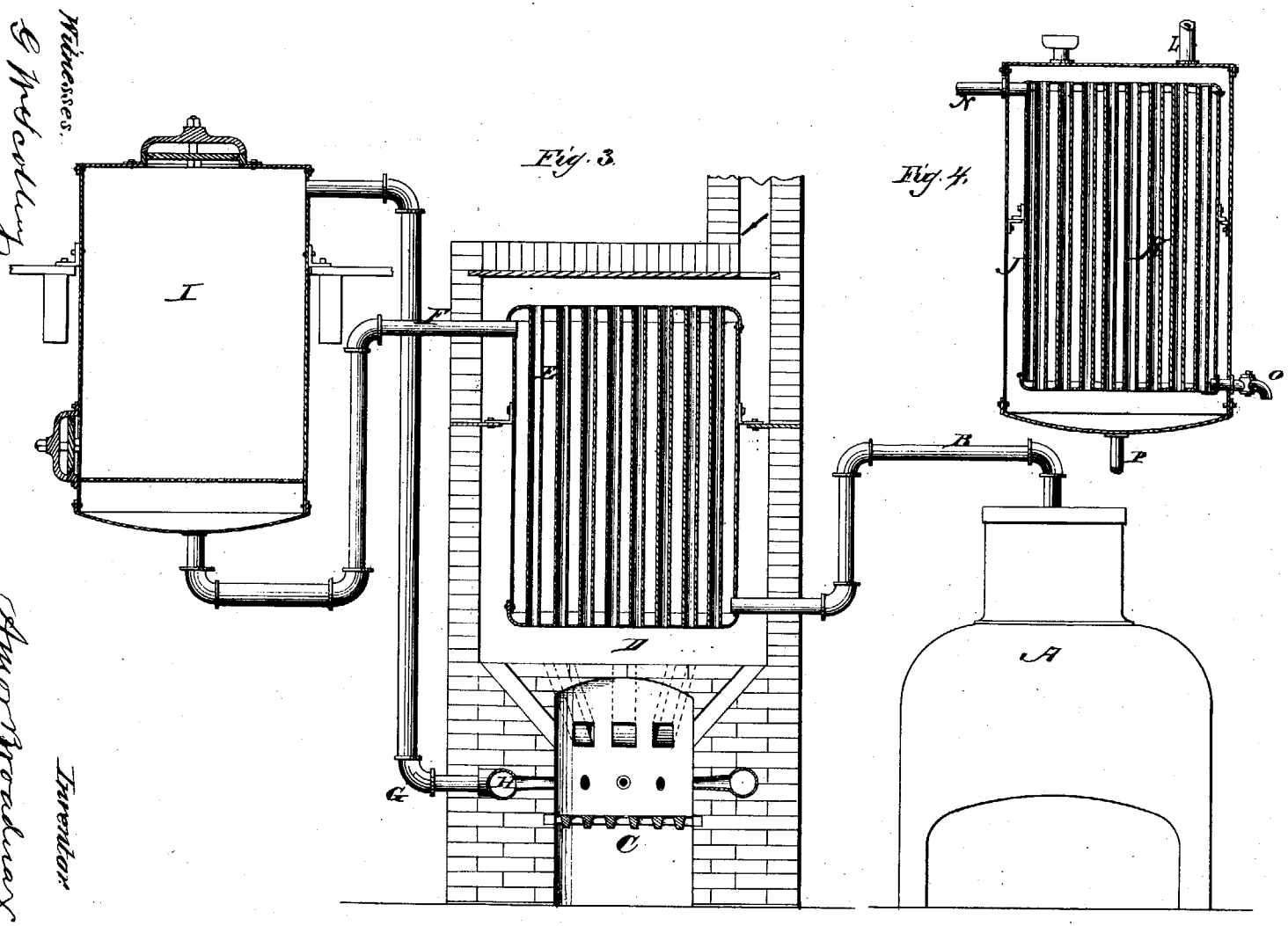
Witnesses.
G W Scollay
C Delafield
Inventor.
Amor Broadnax

UNITED STATES PATENT OFFICE.

AMOS BROADNAX, OF MONT CLAIR, NEW JERSEY.

IMPROVEMENT IN RENDERING AND REFINING ANIMAL MATTER, &c.

Specification forming part of Letters Patent No. 81,744, dated September 1, 1868; reissue No. 5,195, dated December 24, 1872.

*To all whom it may concern:*

Be it known that I, AMOS BROADNAX, of Mont Clair, in the county of Essex and State of New Jersey, have invented certain new and useful Improvements in the Art of Rendering and Treating Animal Matter; and I do hereby declare the following to be such a full, clear, and exact description of my said invention as will enable any one skilled in the arts to which it appertains to work or practice the same, reference being had to the annexed drawing making part of this specification, in which—

Figure 1 illustrates a transverse section through the furnace, steam, and water space of a common Cornish boiler, and a vertical section through a steam or air superheater applied to said boiler, and also a vertical section through a tight rendering tank or digester in which the animal matter is to be rendered or otherwise treated; the boiler being shown by A B, the superheater by E F, and the tank, digester, or receiver by H. Fig. 2 illustrates what is known as a jacket-tank—that is, one tank set inside of another; the animal matter to be rendered or otherwise treated to be put in the inside tank, and the heat, either in the form of hot water, steam, superheated steam, or dry caloric, is introduced in the annular space between the two tanks, shown by B—A representing the inside tank. In this apparatus the work is done by dry surface heat. In the other it is done by throwing the heat in the form of superheated steam or dry caloric directly into and through the receiver containing the matter to be treated. Fig. 3 illustrates a front elevation of a common wagon-boiler, shown by A, a vertical section through a steam superheater, shown by E D, a vertical section through a steam-tight rendering-tank, shown by I; all of which figures illustrate different parts of my invention and different modes of applying the same.

My invention consists in the application of superheated steam or air, through suitable apparatus, to the treatment of animal matter—that is, in melting, cooking, or drying the same. The drawing shows the application of my invention to some of the old styles of rendering or drying apparatus, or apparatus which are or may be used for that purpose; but there are many other forms of apparatus to which it is equally applicable.

In Fig. 3 of the drawing, A represents, as I have before stated, a common wagon-boiler, connected, by means of a pipe, B, to a superheater, shown by E B. This superheater consists of a cylindrical drum filled with tubes and set in a closed brick chamber over a covered or reverberatory furnace constructed with flues radiating from the inside circumference thereof to the inside circumference of the brick chamber in which the tube, drum, or superheater is placed. From the superheater there is a pipe, F, leading to the receiver or digester I, in which the fat or other oleaginous matter is put to be rendered or otherwise treated. Said digester is of the ordinary construction, and is fitted with a false bottom and the usual man-holes by which it is to be filled and discharged; cocks to draw off the rendered fat, and with a pipe, C, to convey the steam and offensive gases and vapors to a pipe, H, set in the brick-work around the furnace, and which pipe is fitted with jet-pipes to distribute the gas and steam over the fire for consumption.

In operating the form of apparatus shown in Figs. 1 and 3, the steam is generated in the boiler A, and is carried from there to the superheater, where it is raised to the desired temperature, and from whence it passes into the digester through the fat or other oleaginous matter under treatment, and out through the pipe C into the fire, pressure enough being maintained in the tank to insure a uniform distribution of the heat through the material. The pressure in the boiler or generator should be high enough to carry the caloric forward out of the superheater and through the fat or other animal matter in the digester, and the pipe G should be kept open, or partially open, so as to insure a continual flow of the superheated steam through the matter under treatment, by which it will be melted, and by which the water contained in it will be carried off at the same time.

In applying my invention to the form of apparatus shown by Fig. 2, or to any apparatus by or in which the material is treated by surface heat—that is, by heat radiated through metal plates or pipes, the superheated steam or air is, of course, introduced between the two tanks A and B—that is, supposing the digester or receiver to be made after the form of Fig. 2. The point or place of applying the superheat.

ed steam or air to the surface of the apparatus will, of course, be governed by the style of apparatus employed; but, whatever style of apparatus be employed, there should be an outlet for the steam, that a slow motion of it may be maintained through the apparatus and a uniform temperature secured. A very small outlet is all that is necessary to secure this result. In the drawing of this apparatus the superheated steam is introduced through the pipe D, and the steam driven off during the process escapes through the pipe C leading to the pipe H around the furnace.

In rendering fat by steam after the old method, it is necessary to carry a high pressure in the tank to obtain the requisite temperature to melt the fat. This pressure and the water present, it is thought, injure the fat and spoil the scrap. They endanger the apparatus, and make it difficult to consume or deodorize the offensive gases, and it is absolutely impossible, with live steam, to dry the scrap or crisp it in the apparatus in which the fat is rendered. These objections are overcome by the use of superheated steam in the place of live or free steam. The simplest and cheapest method of applying the superheated steam is to heat it on its way from the boiler or generator to the tank, receiver, or digester in which the material is to be rendered or otherwise treated. By these means a comparatively low pressure is accompanied by a high temperature. The steam, being highly heated, rapidly reduces the material, and at the same time carries off the water, the superheater acting as a magazine of caloric, which is carried over in the receiver by blowing or passing a current of steam or air through it.

In practicing this invention, the superheater should be constructed and arranged in relation to the fire to insure the necessary temperature without allowing the fire to impinge upon it, and in such manner as to furnish a ready means of regulating the temperature. This is accomplished by putting the superheater in a brick chamber over a covered furnace constructed to throw the caloric up around and through it without impinging against it. The plan is shown in Fig. 3. The steam in this arrangement should enter at or near the bottom of the superheater and pass out at or near the top thereof, and a thermometer should be applied as near the exit-pipe as possible to measure the temperature of the steam as it leaves the superheater.

Other forms or styles of superheater may, of course, be substituted for the one here shown, but this one answers the purpose thoroughly.

Fig. 1 of the drawing shows a modified method of combining the superheater with the boiler. In this case the superheater E F is arranged directly over an ordinary Cornish boiler, with a flue, D, leading from the bottom of it directly down through the water-space to the furnace, the flue being fitted with damper to regulate the admission of heat to the superheater. In this arrangement the steam is carried directly from the steam-space B of the boiler to the superheater through the pipe C, and from thence, through the pipe G, to the receiver or digester H.

By the use of this apparatus and of superheated steam instead of live steam, the fat or animal matter can not only be rendered in the digester, but the refuse can be dried in it also by blowing or forcing the superheated steam through it after the grease and water have been drawn off; but in operating this invention the superheater, or the pipes leading therefrom, should in all cases be fitted with a thermometer to measure the heat as it enters the digester, drier, or still.

Having now described my invention, I claim as new and as my invention—

1. Rendering or otherwise treating animal matter in a tank or digester by blowing or forcing superheated steam, not only in the digester on the material, which is old, but by forcing or blowing superheated steam through the material under treatment, by which it is not only rendered, but the water and gas are taken up and consumed in a reverberatory furnace, substantially as described, or in some other furnace of suitable construction to insure the necessary heat.

2. A steam-superheater in which the temperature can be regulated, as described, in combination with a steam-boiler and rendering-digester, to enable the operator to supply superheated steam of the proper temperature in rendering or otherwise treating animal matter.

3. A tank made to render or otherwise treat the animal matter by surface heat, combined with a steam-superheater in which the temperature can be regulated, as described, and a steam-boiler by which the temperature of the tank can be raised above that of the boiler.

4. A reverberatory furnace made to contain and concentrate the heat, substantially as shown in Fig. 3, combined with or connected to a steam or superheated steam or air rendering apparatus and superheater, for the purpose of destroying or consuming the escaping gases or vapors set free in the process of rendering or otherwise treating animal matter by steam or superheated steam, as set forth.

AMOS BROADNAX.

Witnesses:

G. W. SCOLLAY,

C. DELAFIELD.